(12) United States Patent
Takuma

(10) Patent No.: US 7,545,628 B2
(45) Date of Patent: Jun. 9, 2009

(54) DISPLAY PANEL AND DISPLAY DEVICE

(75) Inventor: Masaaki Takuma, Tokyo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 0 days.

(21) Appl. No.: 11/866,191

(22) Filed: Oct. 2, 2007

(65) Prior Publication Data

US 2008/0130211 A1      Jun. 5, 2008

(30) Foreign Application Priority Data

Oct. 4, 2006      (JP)      ............... 2006-273271

(51) Int. Cl.
G06F 1/16      (2006.01)
G02F 1/1333      (2006.01)
(52) U.S. Cl. ............... 361/679.26; 349/58; 361/679.27
(58) Field of Classification Search ................ 361/681, 361/683, 679.24; 248/917, 919, 291.1; 349/58
See application file for complete search history.

(56) References Cited

U.S. PATENT DOCUMENTS 5,926,237 A * 7/1999 Yun et al. ............... 349/58
6,885,411 B2 * 4/2005 Ogawa et al. ............... 349/58

FOREIGN PATENT DOCUMENTS

JP      11-305209      11/1999

* cited by examiner

Primary Examiner—Jayprakash N Gandhi
Assistant Examiner—Nidhi Desai
(74) Attorney, Agent, or Firm—Finnegan, Henderson, Farabow, Garrett & Dunner, L.L.P.

(57) ABSTRACT

In a display panel mounted on a display device, a configuration of mounting that realizes decrease in thickness and weight and exhibits high reliability as well. The display panel is provided with a screen, a plastic frame supporting at least part of the outer periphery of a surface light source device, and a metallic frame disposed on the outside of the plastic frame. On the plastic frame, bosses for fixing the display panel are formed. The metallic frame is furnished at the positions opposite the bosses with holes that allow insertion of screws for fixing the display panel. The display panel is fixed to the outer cover of the display device by causing the fixing screws to be fastened by screwing into the bosses formed on the plastic frame of the display panel.

3 Claims, 6 Drawing Sheets

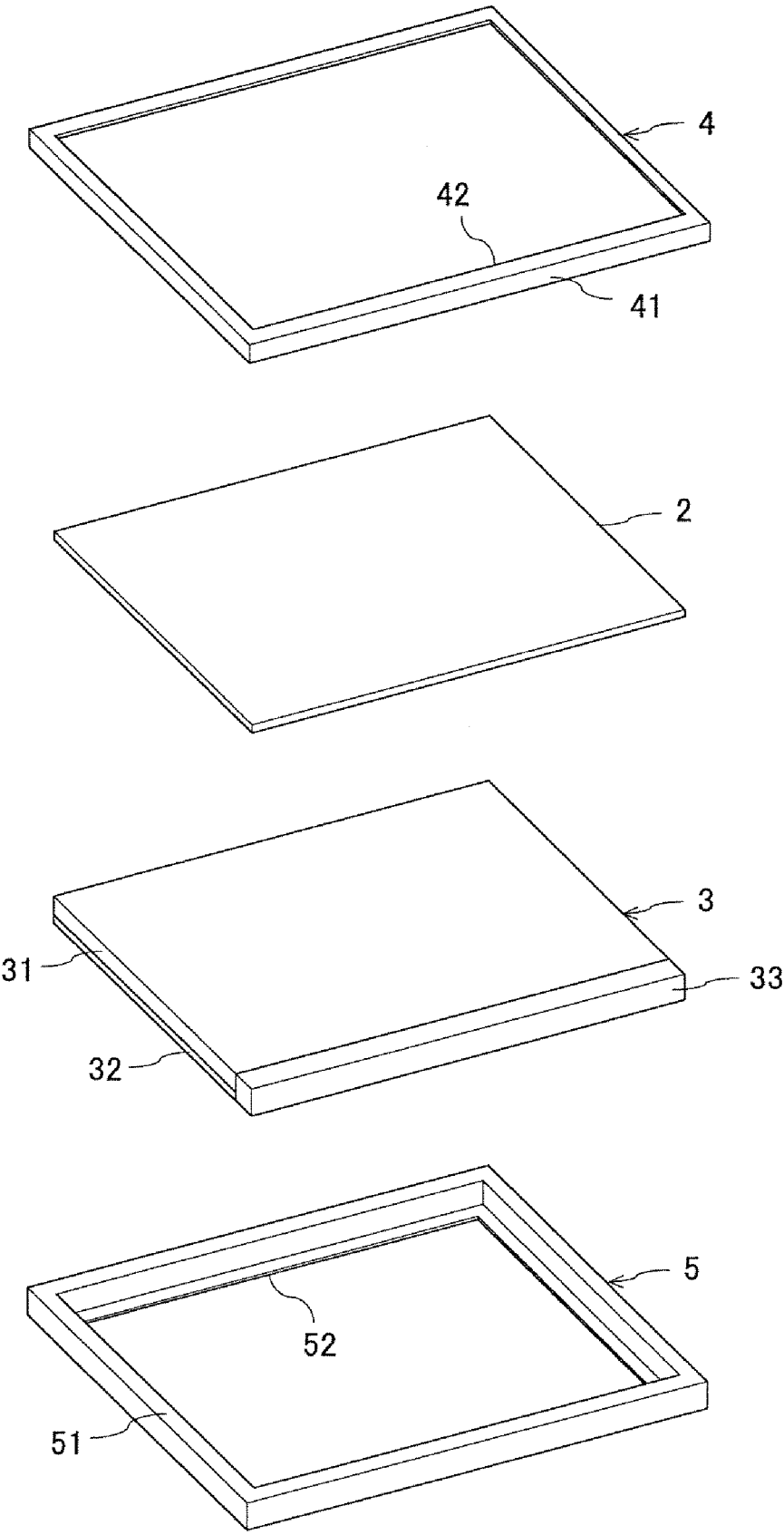
[FIG.1]

[FIG.2]
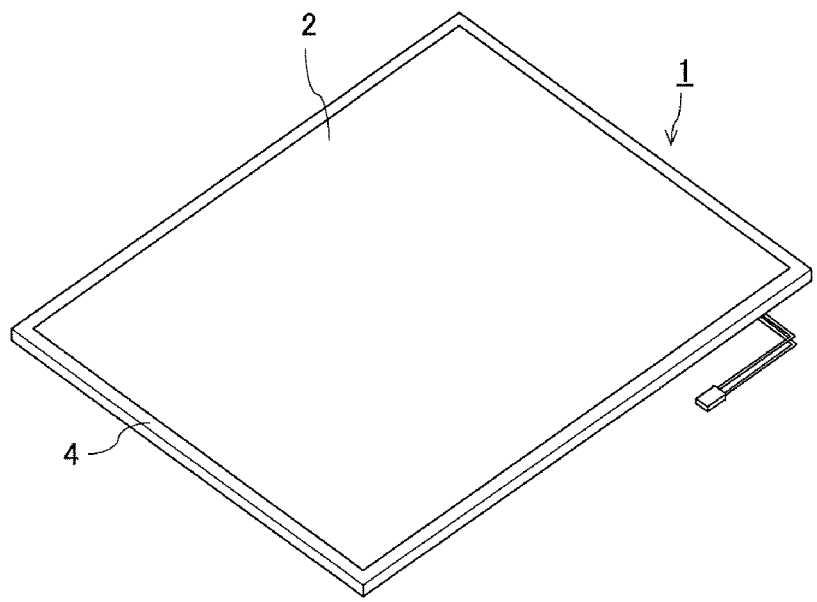
[FIG.3]
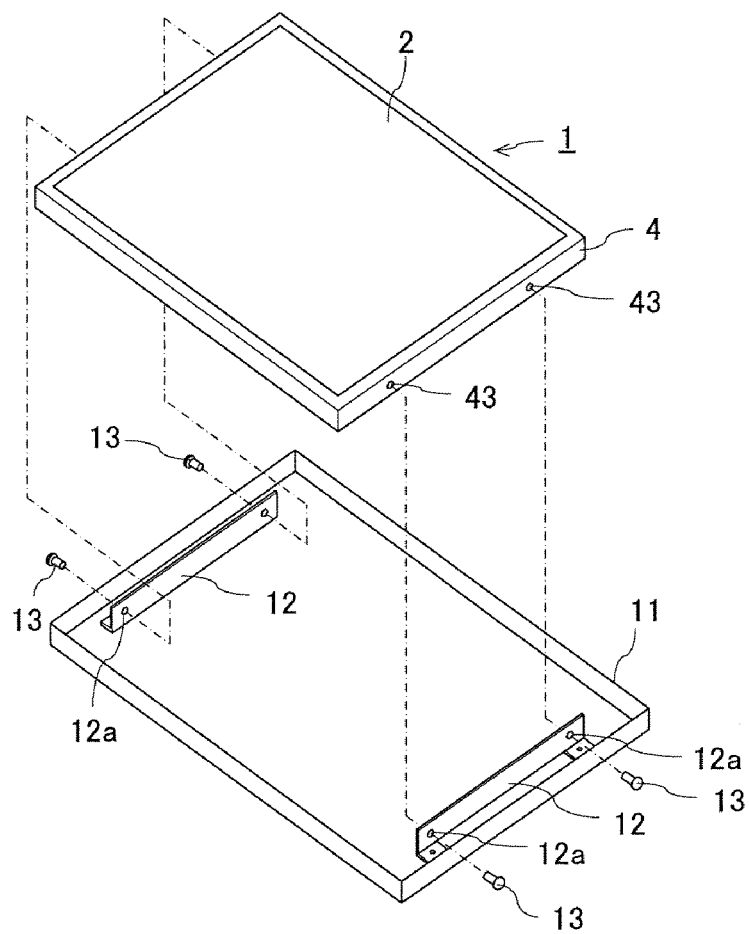

[FIG.4]
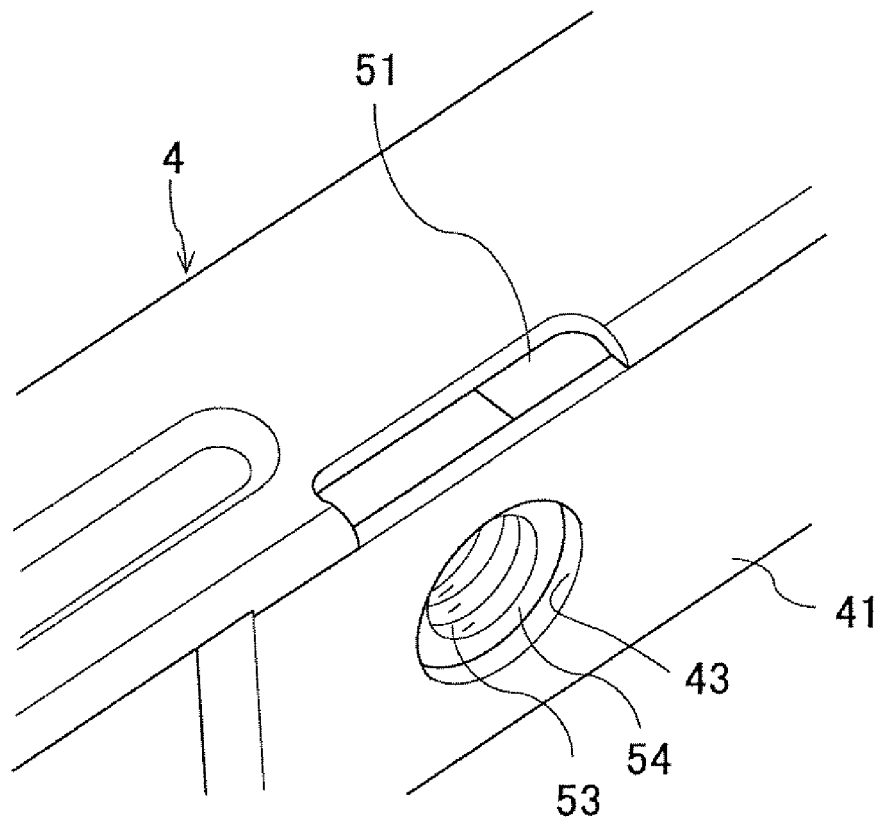
[FIG.5A]
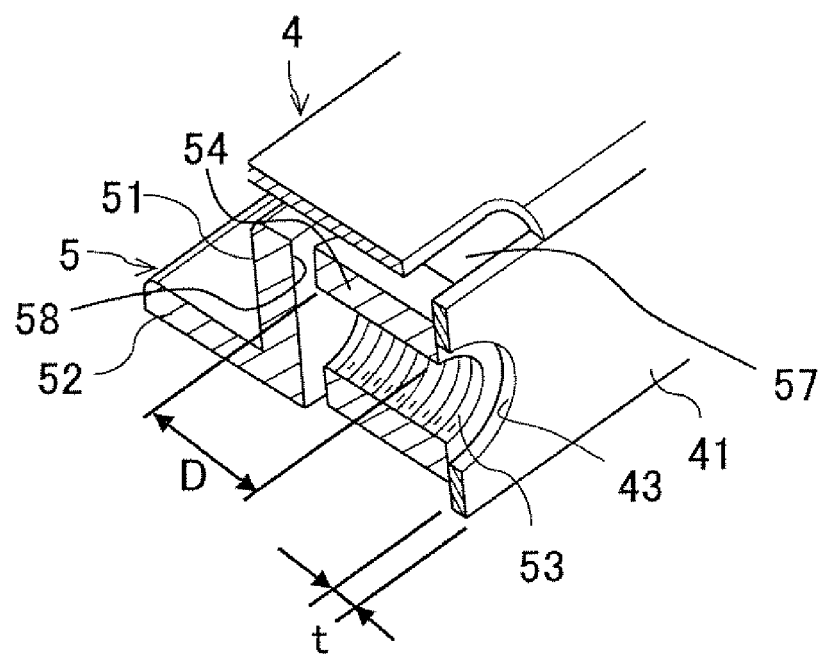

[FIG.5B]
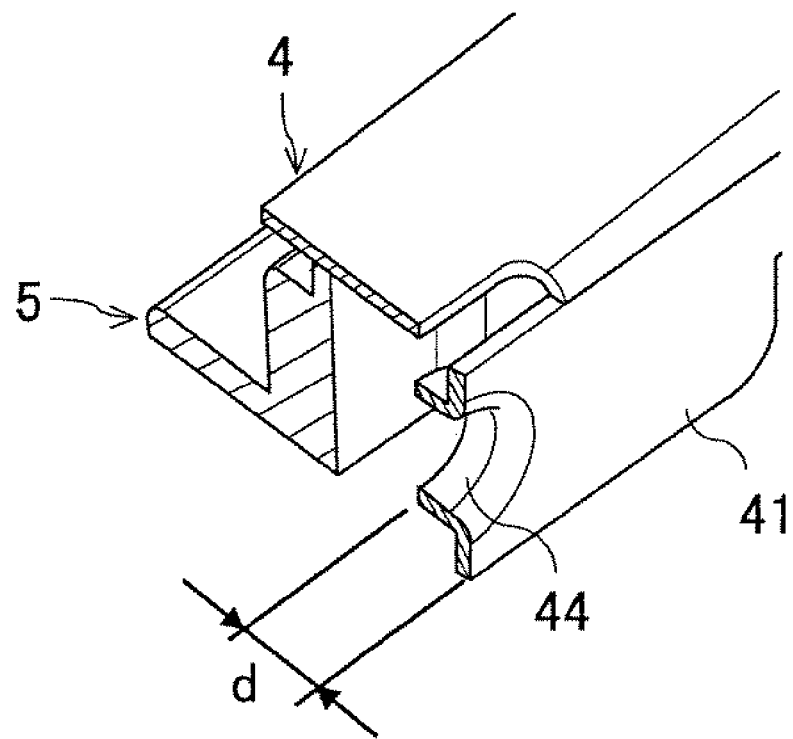
[FIG.6]
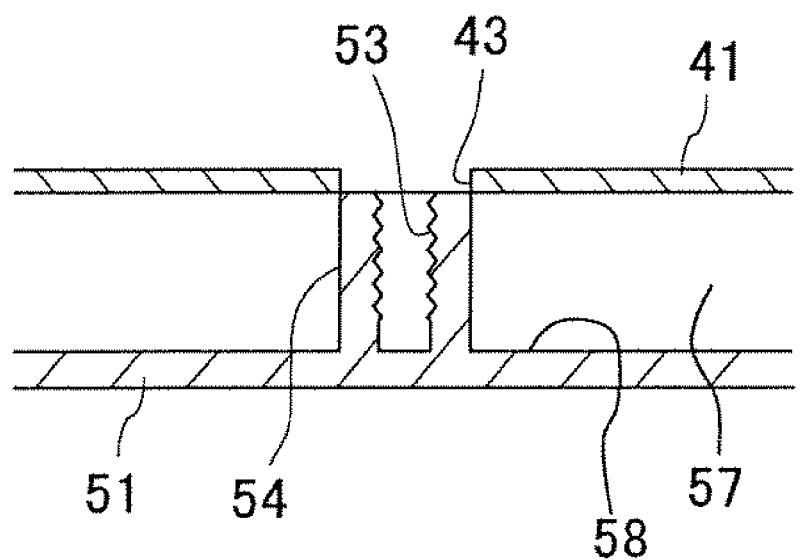

[FIG.7]
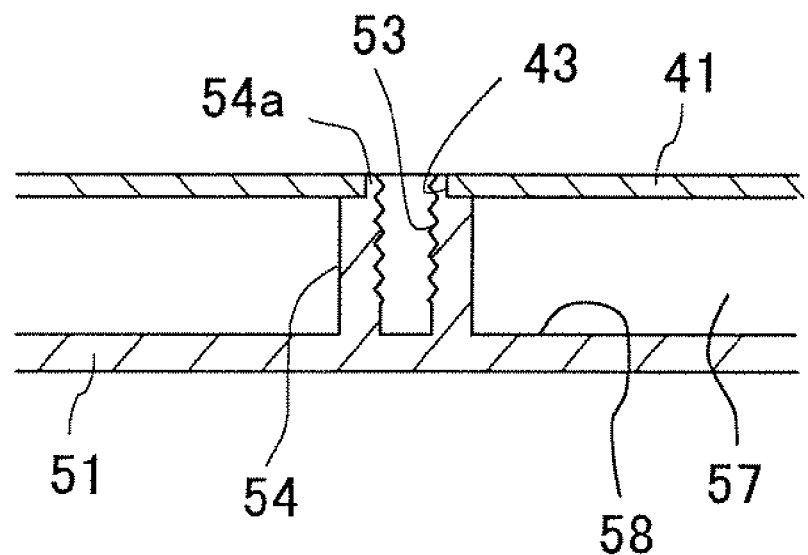
[FIG.8]
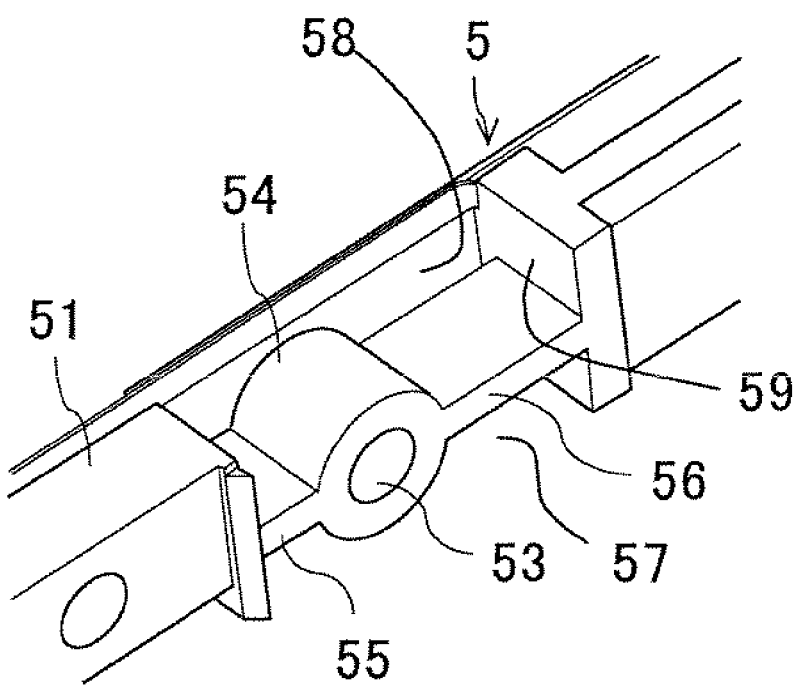

[FIG.9]
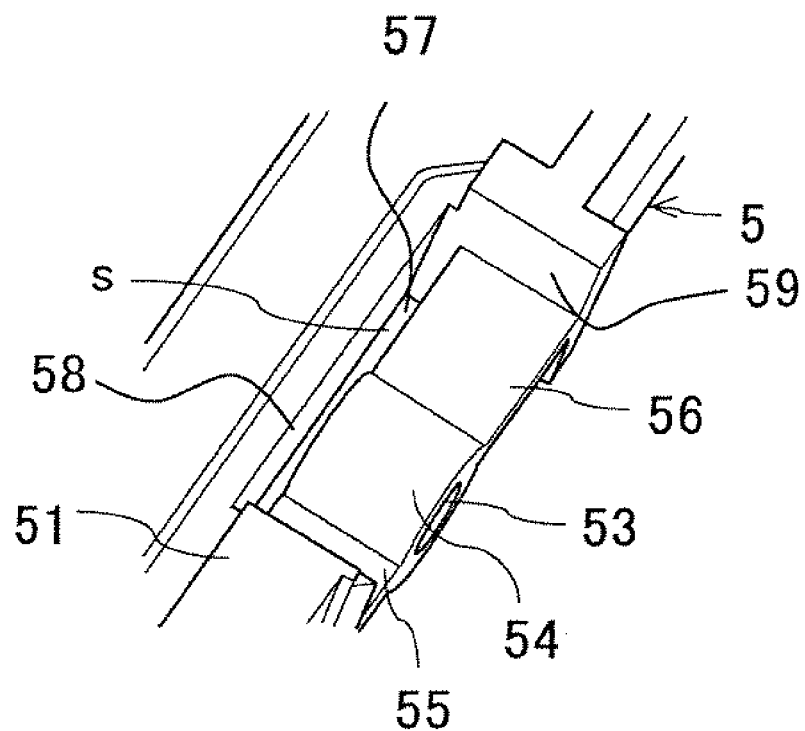
[FIG.10]
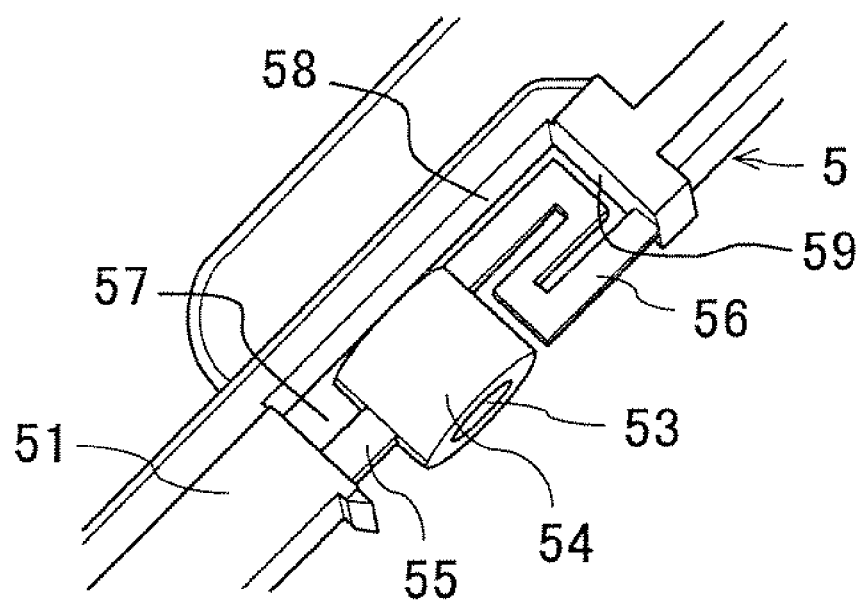

DISPLAY PANEL AND DISPLAY DEVICE

BACKGROUND OF THE INVENTION

1. Field of the Invention

This invention relates to a display panel provided with a screen such as a liquid crystal panel and a display device provided with a display panel and, more particularly, relates to an improvement in the structure for attaching the display panel to the display device.

2. Description of the Related Art

In recent years, as display devices for information equipment including personal computers and word processors and for video and imaging equipment including televisions, camcorders, and car navigation systems, liquid crystal devices having features of lightweight, small thickness, and low power consumption have been widely used. These liquid crystal display devices, with a view to realizing a bright display screen, mostly adopt a configuration having built in a lighting unit (surface lighting source device) directed to projecting an illuminating light from behind a liquid crystal panel.

The lighting units are classified by the location of a light source: an edge light type and a direct backlight type (or direct type). The edge light type is arranged in such a manner that light is introduced to the edge of a light guiding plate disposed on the opposite of a liquid crystal panel. The direct backlight is arranged in such a manner that a plurality of light tubes such as fluorescent radiation tubes are disposed below the liquid crystal panel, and a diffusing plate disposed between the light tubes and the liquid crystal panel. Of the two types, the edge light type is suitable for displays of portable electronics and laptop computers since a light source should be installed at a sidewall of a light guiding plate.

Incidentally, when the surface light source device of the aforementioned edge light type is to be assembled in the display panel, the surface light source device having a light guiding plate is required to be disposed behind the liquid crystal panel. Thus, in order to hold a light guiding plate and a sheet material, the surface light source device and the liquid crystal panel have been held by fitting a metallic frame into a plastic frame that supports the outer peripheral part of a light guiding plate.

The display panel of the structure described above is assembled into an outer cover (housing) for electronics such as a laptop computer. The display panel is ordinarily assembled with screws, for example, by embedding it in a plastic frame with metallic nuts or by fastening it with mounting screws to an outer cover whose metallic frame has screw threads (Refer to JP-A HEI 11-305209).

JP-A HEI 11-305209 discloses a mounting structure for retaining a liquid crystal display device from its side surfaces that has screw holes and screw threads on each side surfaces of the outer covers. The screw threads are burred by being pressed and the inside of the treads are tapped (refer to Paragraph 0013).

SUMMARY OF THE INVENTION

In recent years, in search of higher performance and in consideration of environmental protection, video equipment and office automation equipment have been manufactured more lightly and thinly. In line with the trend, the display devices and the display panels are also required to be manufactured as lightly and thinly as possible. As a result, in the structure of the display panel mentioned above, for example, the metallic frame is made of metal plate which is as thin as possible.

In this situation, an effort to thread on a metallic frame and use the screw threads as a female screw as contemplated by the invention disclosed in JP-A HEI 11-305209 results in failing to secure a sufficient number of screw threads and lacking in stable mounting. Insufficient screw threads might cause screw threads to be broken, for example when threads are repeatedly tightened at assembly and repairing processes. That contributes to quality problem.

This invention has been proposed in view of the technical difficulty mentioned above and is aimed at providing a display panel and a display device both of high quality level such that a mounting structure manifesting high reliability while allowing decrease of thickness and decrease of weight as well can be realized and the hindrance due to breakage of screw threads will not occur.

For the purpose of accomplishing the object mentioned above, this invention is directed to a display panel that is provided with a screen such as a liquid crystal panel, a plastic frame supporting at least part of the outer periphery of a surface light source device, and a metallic frame disposed on the outside of the plastic frame and is characterized by the plastic frame having a boss to fasten a screw that fastens the display panel to the plastic frame and as well having a hole disposed on the opposite of the boss on the metallic frame to insert the screw for fastening the display panel.

Then, the display device of this invention is provided with a display device mentioned above, and characterized by the fact that the display panel is assembled into the outer frame of the display device by fastening the plastic frame of the display panel to the outer frame with screws, and the screws are inserted from the holes of the outer cover into the bosses on the plastic frame.

The display panel of this invention has formed a female screw adapted to fasten a fixing screw to a plastic frame. The plastic frame is thicker than the metallic frame and, therefore, allows a sufficient number of screw threads to be formed therein even when the metallic frame is thin. When the plastic frame is fastened to the display pane with screw, therefore, stable mounting is realized and consequently the screw thread is prevented from being broken when threads are repeatedly tightened at assembly and repairing processes.

Particularly the female screw is integrally formed inside the boss, the tubular projection stuck out from the plastic frame, and the tubular projection is supported with an elastic piece. In doing so, the stress of tightening the screw that applies to the plastic frame can be suppressed and it prevents adverse effects on the display such as the liquid crystal panel supported by the plastic frame. Tightening screws can be more smoothly.

This invention is capable of securing the number of screw threads allowed to be formed in the female screw while realizing manufacture of the display panel in decreased thickness and weight and enabling the display panel to be stably mounted on the outer cover on the display device without breaking screw threads. It is, therefore, capable of providing a display panel and a display device both with high quality.

BRIEF DESCRIPTION OF THE DRAWINGS

FIG. 1 is an exploded perspective view illustrating an example of the structure of a display panel.

FIG. 2 is a schematic perspective view illustrating the display panel in an assembled state.

FIG. 3 is an exploded perspective view illustrating the display panel in a state mounted on the outer cover (housing) of a display device.

FIG. 4 is an enlarged perspective view illustrating the neighborhood of a female screw serving to fasten a fixing screw.

FIG. 5A is a perspective view illustrating as partially broken the neighborhood of the female screw in accordance with an embodiment of the present invention. FIG. 5B is a perspective view illustrating as partially broken the neighborhood of the female screw in accordance with a conventional art.

FIG. 6 is a schematic cross section of an essential part, illustrating a boss formed on a plastic frame.

FIG. 7 is a schematic cross section of an essential part, illustrating another boss on a plastic frame.

FIG. 8 is a schematic cross section of an essential part, illustrating a case of causing a boss forming a female screw therein to be formed as separated from a plastic frame.

FIG. 9 is a schematic perspective view of an essential part, illustrating the plastic frame of FIG. 8 as observed from a varied angle.

FIG. 10 is a schematic perspective view of an essential part, illustrating the supporting plate portion in an altered shape.

DESCRIPTION OF THE PREFERRED EMBODIMENTS

Now, the mode of embodying the display panel and the display device that are contemplated by this invention will be explained below by reference to the accompanying drawings.

FIG. 1 is an exploded view illustrating a display panel 1 (liquid crystal display panel) in which a surface light source is assembled. The display panel in the present mode of embodiment is provided, as illustrated in FIG. 1, with a liquid crystal panel 2 and a light source panel 3 and is enabled to retain these panels by the combination of a metallic frame 4 and a plastic frame 5.

The liquid crystal panel 2 is built by having a liquid crystal material sealed in between an array substrate and a counter substrate. The array substrate has picture element electrodes and switching elements (thin-film transistors) formed in the shape of a matrix in conformity with display picture elements. On the array substrate, signal wires for sending electric signals to the picture element electrodes and signal wires for supplying the thin-film transistors, namely switching elements, with electric signals are disposed as mutually intersecting perpendicularly. On the other hand, the counter substrate has a counter electrode formed of a transparent electrode material (ITO, for example) on substantially the whole surface thereof so as to form color filter layers in conformity with the picture elements. Further, on the outer surfaces of the array substrate and the counter substrate mentioned above, the polarization plate and the polarization axe are orthogonally attached together.

To the liquid crystal panel 2 possessing the structure mentioned above, a circuit board for supplying the liquid crystal panel 2 with driving signals is electrically connected. The image display is accomplished by the switching elements being driven based on the driving signals from the circuit board. The region in which this image display is carried out constitutes a display region and the liquid crystal panel 2 mentioned above is fated to own the display region that has arrayed a plurality of display picture elements.

The light source panel 3 mentioned above is assembled as a backlight for the liquid crystal panel 2 and is provided with a light guiding plate 31 for irradiating from a light source to the back surface of the liquid crystal panel 2 and a reflecting sheet 32 disposed on the back surface side of this light guiding plate 31. The light source is disposed along at least one side of the light guiding plate 31. In the case of the present mode of embodiment, a light source circuit board 33 having loaded an LED light source is installed in the long side of the light guiding plate 31. The light emitted from the LED light source is reflected directly or via the reflecting sheet 32 and guided to the light guiding plate 31, passed through the light guiding plate 31, and irradiated on the liquid crystal panel 2. The liquid crystal panel 2 transmits the reflected light and eventually displays images such as irradiated images and characters in prescribed brightness.

The metallic frame 4 is made of such a metallic material as stainless steel and the plastic frame 5 is made of various plastic materials. The metallic frame 4 and the plastic frame 5 are respectively furnished with outer frames 41 and 51 disposed substantially perpendicularly to the main surfaces of the liquid crystal panel 2 and the light source panel 3. These outer frames 41 and 51 serve to hold the outer peripheries respectively of the liquid crystal panel 2 and the light source panel 3. The metallic frame 4 is provided in the top part thereof with a supporting part 42 overhung inward and this supporting part 42 is built to support the outer peripheral part of the upper surface of the liquid crystal panel 2. The plastic frame 5 is similarly provided with a supporting part 52 that extending inwardly in the middle of the height of the plastic frame 5, and the upper surface of the supporting part 52 supports the outer peripheral edge of the light source panel 3 from beneath The liquid crystal panel 2 and the light source panel 3 are supported by being sandwiched between the supporting part 42 of the metallic frame 4 and the supporting part 52 of the plastic frame 5.

FIG. 2 shows the assembled display panel 1 in which the liquid crystal panel 2 and the light source panel 3 are supported by the so-called joint structure between the metallic frame 4 and the plastic frame 5.

The display panel 1 mentioned above is assembled as a screen for a laptop computer, for example, and is used for displaying various information. In this instance, the display panel 1 is required to be fastened to the outer cover (housing) of the laptop computer. The display panel is generally fastened with screws. As illustrated in FIG. 3, for example, the display panel 1 is fastened to a laptop computer housing 11 by screwing fixing screws 13 through mounting holes 12a disposed on a supporting plate 12 on the laptop computer housing 11. FIG. 3 illustrates four portions are fastened with the fixing screws 13, in particular, two portions each on the short side of the display panel 1.

Prior to screwing the display panel 1, it is necessary that female screw parts be formed at the positions corresponding to the mounting holes 12a in the supporting plate 12 of the display panel 1. At this time, an effort to form female screws in the metallic frame 4 serving as an outer frame for the display panel 1 results in incurring difficulty in forming a sufficient number of screw threads and acquiring a stable mounting state when the metallic plate for the metallic frame 4 is thin. Screw threads might be broken when threads are repeatedly tightened at assembly and repairing processes.

The present mode of embodiment, therefore, contemplates forming female screw parts 53 in the outer frame 51 of the plastic frame 5 as illustrated in an enlarged state in FIG. 4 and fastening the fixing screws 13 thereto by screwing. To be specific, recesses 57 having a prescribed width in the direction of wall thickness of the outer frame 51 are formed in the outer frame 51 of the plastic frame 5, the recesses 57 are extended from bottom surfaces 58 of the recesses 57 toward the exterior of the outer frame 51 at the positions for fastening the fixing screws 13 by screwing in the recesses 57, cylindrical bosses (tubular projections) 54 reaching substantially the same height as the outer surface of the outer frame 51 are formed as integrally implanted in the bottom surfaces 58 of the recesses 57, and screw threads conforming to the fixing screws 13 are formed on the inner wall surfaces of the bosses 54 and used as the female screw parts 53.

In conformity to female screws 53 on the plastic frame 5, the metallic frame 4 should include circular holes 43 for allowing the fixing screws 31 to be inserted. While the holes 43 are formed in a size allowing the fixing screws 13 to be inserted, the diameter of the holes can be adjusted to be smaller than that of the head of the fixing screw 13.

FIG. 5 illustrates the difference in sizes of screw threads when the female screws are formed in the plastic frame 5 and in the metallic frame 4. FIG. 5A shows the female screws 53 that are formed in the plastic frame 5, and FIG. 5B shows female screws 44 that are screw threads formed by squeezing the metallic frame 4.

When the female screw 53 is formed in the outer frame 51 of the plastic frame 5 as illustrated in FIG. 5A, the size D (the size of depth of the circular recess) allowing a screw thread to be formed in the female screw 53 can be arbitrarily set so long as it is smaller than the size of thickness of the outer frame 51. To be specific, the size D mentioned above can be freely set in the range in which the cylindrical boss 54 avoids surpassing the outer surface of the outer frame 51. Within this range, the size that allows formation of a sufficient number of screw threads conforming to the screw threads of the fixing screw 13 mentioned above can be set. The size D is not restricted by the thickness t of the metallic frame 4.

When a female screw part 44 is formed in the metallic frame 4 as illustrated in FIG. 5B, the size d that allows formation of screw threads is restricted by the thickness of the metallic frame 4. Generally, the available number of screw threads that can be formed in the metallic frame 4 is determined by the height 1.5 to 2 times the thickness of the metallic frame 4. When the thickness of the metallic frame 4 is 0.5 mm and the pitch of the fixing screws 13 is 0.4 mm, for example, the standard workable height will be 0.5 mm×2=1 mm and the available number of screw threads will be 1 mm÷0.4 mm=2.5 (threads). Though the minimum number of threads (two threads) that is generally required can be secured, virtually no allowance is granted. A further decrease of the thickness of the metallic frame 4 will be at a disadvantage for the sake of screwing because the available number of screw threads that can be formed is further decreased.

By forming in the plastic frame 5 the female screw parts 53 corresponding to the fixing screw 13 as described above, it is rendered possible to increase the number of formable screw threads and realize a stable state of mounting. Further, the possibility that the screw threads will be broken can be repressed even when the tying work is repeated during the operation of assembling and the operation of repairing, for example.

Incidentally, while the aforementioned female screw 53 may be obtained solely by forming a cylindrical recess in the outer frame 51 of the plastic frame 5, it is more favorably obtained by forming a cylindrical projection (so-called boss) in the recess 57 of the outer frame 51 of the plastic frame 5 as mentioned above. FIG. 6 is a schematic cross section of the essential part, showing the structure forming the boss 54 in the plastic frame 5 and the female screw 53 in the boss 54. By adopting this structure, it is possible to suppress the stress applied to the plastic frame 5 during screwing, and maintain the strength of screwing.

The plastic frame 5, as described formerly, plays a key role in sandwiching the liquid crystal panel 2 and the light source panel 3 with the metallic frame 4 and consequently holding them. When the boss 54 is integrally implanted in an independent form on the plastic frame and the female screw 53 is formed therein as described above, it is possible to suppress the stress applied to the plastic frame 5, the liquid crystal panel 2 and the light source panel 3 during screwing and lead to prevent the display quality from decreasing. When the optical structural element is exposed to stress and consequently suffered to induce strain, it possibly entails such problems as degrading optical properties and lowering the quality level of display. When the boss 54 is integrally implanted in an independent form on the plastic frame and the female screw 53 is formed therein as described above, it is possible to suppress the stress applied to the plastic frame 5, the liquid crystal panel 2 and the light source panel 3 during screwing and lead to prevent the display quality from decreasing.

When the boss 54 mentioned above has its leading edge formed as a minor diameter 54a conforming in size with the hole 43 of the metallic frame 4 and the plastic frame 5 and the metallic frame 4 are assembled in a form having the minor diameter part 54a inserted in the hole 43 mentioned above as illustrated in FIG. 7, the structure of screwing will be more stable. Further, since the hole 43 of the metallic frame 4 is made to fit the minor diameter 54a of the boss 54, it incidentally functions as a means for locating the metallic frame 4.

Then, for the purpose of further alleviating the stress generated during the course of screwing, the boss 54 mentioned above may be integrally formed in a state of being connected to a side face 59 of the outer frame 51 in the recess 57 of the plastic frame 5.

FIG. 8 illustrates the case of having the cylindrically shaped boss 54 partly connected to the outer frame 51 of the plastic frame 5. As illustrated in FIG. 6 and FIG. 7, the boss 54 is integrally projected in the state of being implanted on the bottom surface 58 in the recess 57 of the outer frame 51 for the plastic frame 5. In the present case, part of the outer wall surface of the boss 54 and part of the side face (inner wall surface) 59 in the recess 57 of the plastic frame 5 are integrally formed as connected with two sheet-like connecting parts 55, 56. The boss, thus formed, is enabled to increase its mechanical strength and as well manifest an effect of alleviating the stress applied to the plastic frame 5 during the course of a screwing operation as compared with the case of merely forming the female screw in the plastic frame 5. The boss 54 and the connecting parts 55 and 56 may be so constructed as to float from the bottom surface 58 of the recess 57 of the plastic frame 5. Specifically, as illustrated in FIG. 9, a gap s is formed between the boss 54 and the bottom surface 58 in the recess 57 of the outer frame 51 of the plastic 5 and the boss 54 is made to assume the state of being supported as separated from the bottom surface 58 of the outer frame 51 with the two connecting parts 55 and 56. The connecting parts 55 and 56 become to support elastically the boss 54 by utilizing the flexibility of resin and fulfill the role of alleviating the stress exerted during the operation of screwing the boss 54 and alleviating the stress propagated to the plastic frame 5.

Separating the boss from the plastic frame 5 is only required modifications for molds of the plastic frame 5. The outer frame 51, the boss 54, and the connecting parts 55 and 56 can be integrally molded in a hollow shape.

FIG. 10 illustrates the case of causing the one connecting part 56 of the connecting parts 55 and 56 that are jointly supporting the boss 54 to be altered in a shape snaking in the direction of the wall thickness of the plastic frame 5. By altering the shape of the connecting part 56 in the snaking pattern, it is rendered possible to alleviate the stress effectively. The altered shape also can cope with a dimensional change caused by thermal expansion, for example. In this case, the alteration can be applied to either or both of the connecting parts 55 and 56.

Since the display panel and the display device of this invention that have such structures as described above adopt a configuration of forming the boss 54 in the plastic frame 5 and then forming the female screw 53 in the boss 54, they are able to improve the reliability of the female screw 53. Following this invention, therefore, it is possible to improve the workability and the accuracy of assembly as well as reliability of the female screws, and consequently improve the product quality controlling the variation of product accuracy. It is further capable of realizing decrease of thickness and weight in the relevant products to the same degree as attained heretofore and realizing better quality level than attained heretofore.

What is claimed is:

1. A display panel comprising:
 a screen;
 a plastic frame supporting at least part of an outer periphery of a surface light source device; and
 a metallic frame disposed outside said plastic frame;
 wherein the plastic frame is integrally formed with a tubular boss and a pair of connecting parts, the plastic frame includes a recess in which the boss is disposed, the recess includes a screwing position where a screw for fastening the display panel is fastened;
 the boss includes an outer wall surface, the connecting parts extend in a longitudinal direction of an outer frame of the plastic frame, the connecting parts integrally connect the outer wall surface of the boss to opposite sides of an inner wall surface of the recess of the plastic frame;
 the metallic frame is opposed to the boss and includes a hole in which the screw is inserted; and
 the boss is supported by the connecting parts so that a gap is formed between the boss and a bottom surface of the recess in the outer frame of the plastic frame.

2. A display panel according to claim 1, wherein at least one of the connecting parts is formed in a snaking pattern along a direction of wall thickness of the plastic frame.

3. A display device comprising the display panel set forth in claims 1 or 2, wherein:
 the display device includes an outer cover including a hole; and
 the plastic frame of the display panel is fastened to the outer cover of the display device with the screw inserted from the hole in the outer cover into the boss on the plastic frame.

* * * * *